UNITED STATES PATENT OFFICE 1,980,483

RESIN AND RESIN FORMING COMPOUND

Rowland Hill, Blackley, England, assignor to Imperial Chemical Industries Limited, a corporation of Great Britain No Drawing. Application November 3, 1932, Serial No. 641,113. In Great Britain November 17, 1931

11 Claims. (Cl. 260—2)

The present invention relates to a new resin-forming compound, the production of a new polymerization product having valuable properties, and of molded bodies therefrom.

According to the invention I polymerize, with the aid of radiant energy (light or heat), a catalyst, or otherwise, the hitherto unknown monomeric alpha methyl methacrylate (methyl α-methacrylate), and obtain a thermoplastic colourless polymerization product of particular properties. Further, and also in accordance with the invention, I subject the said thermoplastic colorless polymerization product to heat and pressure in any appropriate way, as by pressing, molding or extruding while in a plastic condition, and thereby obtain molded bodies which are both tough and hard.

The hitherto unknown monomeric alpha methyl methacrylate may be obtained by treating methyl α-hydroxyisobutyrate with a dehydrating agent, e. g. phosphorous pentoxide. Monomeric alpha methyl methacrylate is a water-white liquid, boiling point 100–101° C. at atmospheric pressure, freezing point about —56° C., specific gravity 0.94 at 20° C. It may be polymerized, according to the invention, by means of heat, light, and/or catalysts, e. g. as described for the polymerization of organic vinyl esters in British specification No. 15271/1914. Preferably a catalyst such as oxygen, ozone, an organic peroxide, an ozonide, or an agent giving off oxygen is employed. The polymerization is effected in the presence or absence of a solvent or diluent, or the substance may be emulsified and then polymerized. Preferably polymerization is carried out at a moderate heat, i. e., such that the temperature is from 60–100° C., although higher temperatures, say 130° or even more, may be used. The polymerization reaction is strongly exothermic, and it may be necessary to control the temperature by cooling devices. Diverse devices for effecting continuous polymerization, with or without refluxing, may be employed.

The polymerization product so obtained which is a polymeric alpha methyl methacrylate resin, is a characteristically tough and hard material, which varies from a clear, almost water-white to a somewhat opaque, porous body, depending upon the specific conditions of polymerization.

The polymerization product is particularly suitable for thermoplastic molding because of its valuable property of setting from a plastic moldable condition into a rigid solid within a comparatively small temperature range.

In carrying the second step of the invention into practical effect, the polymerization product is, if necessary, pulverized and placed in a mold, preferably already hot. The mold is then closed and the material heated and pressed. A suitable temperature is from 80–200° C., the specific temperature employed depending, inter alia, upon whether a plasticizing agent is present; a suitable pressure is from 0.1 ton per sq. in. upwards. Obviously variations in the conditions of molding to suit the nature of the mold the particular operation, etc., may be made. The mold is preferably cooled to below 100° C. before the molded body is removed.

In molding by extrusion, the polymerization product is put into an appropriate container and heated to a temperature at which it is sufficiently plastic. It is then extruded by pressure through nozzles into a cooled mold.

The molded bodies so obtained are surprisingly tough, hard, and rigid, and generally possess a high mechanical strength which remains substantially unaffected by changes in atmospheric temperature. When the polymerization product is used alone, the molded bodies are colorless and light-fast, and possess a glass-like transparency. They remain practically unaffected by immersion for long periods in water. They can be subjected to a temperature of 100° C. without undue softening or marked deformation. In electrical properties such as volume resistivity, phase angle difference and freedom from "tracking", the new molded bodies are superior to those made from well known phenol-aldehyde compositions which find such a wide application in the electrical industry.

The molded bodies are relatively uninflammable, tasteless, and odorless.

It is a matter for surprise that the polymeric alpha methyl methacrylate resin differs so sharply in physical properties from the polymers of known structurally related compounds. Thus, for instance, polymerized methyl acrylate is a relatively soft, plastic, rubber-like substance, and, as I have found in the course of my investigations, ethyl methacrylate polymer likewise lacks those mechanical properties, the combination of which is the valuable characteristics of the new polymer and the molded bodies obtained therefrom. For example, the resistance to impact in the case of alpha methyl methacrylate polymer is approximately seven times that of the ethyl methacrylate polymer.

I have found that the polymerization may be conducted under pressure. Molded bodies are thus obtained directly, perfectly transparent, and free from bubbles. This embodiment of the invention is adapted for the production of shaped articles and particularly for the manufacture of transparent glass-like masses to be cut, sawed, or otherwise worked into sheets, panels, rods, etc.

It is also within the scope of the invention to add filling materials (e. g. china clay, wood flour, asbestos, etc.) and/colouring matters, soluble and insoluble, to the polymerization product prior to molding or to the methyl methacrylate prior to polymerization. Such materials as metallic powders, crushed mica, may be added in a similar way. The filling materials, coloring matters, etc. may be incorporated with the polymerized product on heated rolls.

It is further within the scope of the invention to add substances, before or after polymerization, which will dissolve in the polymer and so modify the properties of the molded bodies or will facilitate the molding operation. Thus I may add plasticizing or softening agents such as, for example: camphor; phthalates, such as ethyl, propyl, isopropyl, butyl, isobutyl, cyclohexyl, methyl cyclohexyl, or benzyl phthalate or phthalates of the mixed type such as cyclohexyl butyl, benzyl butyl or butyl lauryl phthalate; esters of dibasic acids, such as the ethyl, propyl, isopropyl, butyl, isobutyl, cyclohexyl, methyl cyclohexyl or benzyl esters of succinic, fumaric, tartaric, adipic and sebacic acids; esters of monobasic acids, such as the butyl, isobutyl, cyclohexyl, methyl cyclohexyl, benzyl or lauryl esters of lauric, laevulinic, benzoic, benzoyl propionic and benzoyl benzoic acids; esters of polyhydric alcohols, e. g. glycol and glycerol, such as glycol benzoate, glycol laevulinate, triacetin, tripropionin and tributyrin; substituted toluene sulphonamides, such as ethyl paratoluenesulphonamide; substituted amides, such as tetraethyl phthalamide, tetrabutyl succinamide, tetrabutyl adipamide, tetraethyl phthalamide; hydrocarbons, such as dixylyl ethane; halogenated hydrocarbons, such as chlorinated diphenyls and dichlordibenzyl; ether compounds such as dicresoxy ethyl ether; and non-drying or semi-drying oils, such as castor oil. These additions also facilitate later mechanical treatment, as cutting, sawing, and polishing.

The molded bodies may have the form of slabs, discs, or sheets, and as such may be used in the manufacture of unsplinterable glass. As will be obvious, the invention is of wide application. Molded sheets may be used by themselves when a transparent medium of good mechanical properties is needed. Molded articles may be made, e. g. tableware, knick-knacks, novelty cases, cabinets, and the like. By suitably choosing soluble dyestuffs and by stratifying or otherwise filling the mold variegated effects of remarkable beauty may be obtained.

The invention may be illustrated by the following detailed examples of particular embodiments thereof.

*Example 1.*—When a mixture of 30 parts by weight of phosphorus pentoxide, 10 parts quinoline, and 25 parts methyl alpha hydroxyisobutyrate, contained in a distillation flask, is heated in an oil bath to 120–130° C., a fairly vigorous reaction sets in. On distillation of the product crude alpha methyl methacrylate distilling at 100–110° C. is recovered. The crude material is redistilled to yield colorless, liquid alpha methyl methacrylate boiling at 100–101° C., atmospheric pressure.

*Example 2.*—Monomeric alpha methyl methacrylate (B.P. 100–101° C.) is mixed with 0.5% by weight of benzoyl peroxide and the mixture is heated at 100° C. for four hours. On cooling a pumice-like mass is obtained. This is pulverized and, for example, 20 grams is introduced into a disc mold, 4" diameter, which is then heated at 140–150° C. for two minutes under a pressure of 2 tons per sq. inch. The mold is cooled to below 60° C. and the molded disc ejected.

The molded disc is hard, tough, transparent, colorless, and free from bubbles. It has taken the shape of the mold perfectly. The molded substance does not soften at temperatures of 60–70° C. and does not become brittle at 0° C. It is highly resilient and possesses a high shock resistance. It does not absorb moisture.

As an alternative procedure and for the purpose of facilitating the molding operation the powdered polymer, prior to introduction into the mold, may be mixed with one-third its weight of butyl phthalate.

*Example 3.*—Four parts by weight of monomeric alpha methyl methacrylate and 1 part of dibutylphthalate are mixed and 0.04 parts of benzoyl peroxide are added. Polymerization is carried out as described in Example 2. The mass obtained is pulverized and molded at 90–100° C. and 1 ton per sq. inch pressure. The molded substance resembles that of Example 2, but softens at a somewhat lower temperature. It has a high shock resistance, somewhat lower than that of the product of Example 2.

*Example 4.*—To 100 parts of monomeric alpha methyl methacrylate are added 0.3 parts of sodium perborate and 0.65 parts of acetic anhydride. The mixture is then heated at 60° C. Polymerization sets in after 4 hours, and proceeds smoothly, the mass becoming more and more viscous, until after 20 hours, polymerization appears to be substantially complete.

The polymer so obtained is a hard, tough, perfectly colorless mass, transparent but filled with bubbles. The mass is pulverized ready for use in molding. An illustrative example of this will be given.

Twenty grams of the pulverized polymer are introduced into a 4" diameter positive mold and subjected to a pressure of 8 tons per sq. inch at 125° C. for 2 minutes. The mold is then cooled to 95° C. and the molded disc ejected.

*Example 5.*—A solution of equal parts by weight of monomeric alpha methyl methacrylate in acetone is heated in a closed container for 10 days at 100° C. At the end of that time the solvent and any unpolymerized ester are removed by blowing steam thru the mixture.

*Example 6.*—100 parts of monomeric alpha methyl methacrylate containing 1 gm. benzoyl peroxide are added slowly with rapid stirring to a solution of 4 parts of sodium isopropylnaphthalene-sulphonate, and 2 parts of Turkey-red oil in 400 parts of water. The emulsion obtained is heated at 80–90° C. for 3 hours under a reflux condenser. Any unpolymerized ester is then removed by blowing steam thru the mixture. After cooling the polymer is coagulated by pouring the mixture into 800 parts of dilute (normal) hydrochloric acid. The precipitate is filtered off, thoroughly washed with water, and dried at 60–70° C. The so obtained polymer is a colorless, finely granular substance, which may be molded as described in Example 4.

*Example 7.*—Monomeric alpha methyl methacrylate is mixed with 0.5% by weight of benzoyl peroxide and poured into a suitable mold. This is then heated in a closed vessel at 130° C. for 4 hours, under a pressure of 20 atmospheres. Polymerization takes place and the polymer takes the shape of the mold, being obtained in the form of a pale, straw-colored, extremely hard, tough, transparent block, free from bubbles. The block may be planed, cut, rolled, or otherwise worked into sheets.

Example 8.—Thirty parts of monomeric alpha methyl methacrylate and 0.15 parts of benzoyl peroxide, are mixed and 10 parts of titanium white and 10 parts of china clay are added to give a suspension. This is heated at 100° C. for 4 hours. The pigmented polymer is pulverized, and can then be molded into white opaque bodies which are light fast and possess good mechanical properties.

Example 9.—One hundred parts of monomeric alpha methyl methacrylate are mixed with 0.5 parts of benzoyl peroxide and 0.1 part of the diazo dyestuff obtained by coupling tetrazotized diamino-di-p-xylolphenylmethane with $\beta$-naphthol. The dyestuff dissolves. The mixture is heated for 4 hours at 100° C. The so obtained polymer gives beautiful transparent bright orange red molded bodies.

Example 10.—Methyl methacrylate on exposure to a temperature of 65° C. for from 1 to 10 days is converted into a hard, clear, glass-like mass which softens only at 60–70° C.

Example 11.—Two hundred grams of monomeric alpha methyl methacrylate contained in thin-walled pyrex tube of 1" diameter was polymerized to a hard glass-like body after 14 days exposure to direct sunlight. 20 grams of methyl methacrylate in a 1" quartz tube was polymerized in 5 days under a mercury vapor lamp. On a large scale the polymerization may be effected in open trays arranged directly under the mercury lamp.

Various changes and modifications may be made without departing from the invention or sacrificing the advantages thereof.

I claim:

1. Polymeric alpha methyl methacrylate resin being characterized by its thermoplasticity, toughness, and hardness.

2. A new composition of matter comprising polymeric alpha methyl methacrylate resin, said resin being glass-like, water impermeable, and, up to 100° C., rigid.

3. A granular thermoplastic molding composition comprising a polymeric alpha methyl methacrylate resin, said resin being moldable to a tough, rigid solid.

4. A molding composition comprising a thermoplastic polymeric alpha methyl methacrylate resin, said resin softening only above 100° C. and being capable of setting from a plastic moldable condition into a rigid solid within a comparatively small temperature range.

5. A new composition of matter comprising a polymeric alpha methyl methacrylate resin and a plasticizer therefor, said resin being moldable to a tough, rigid solid.

6. A new composition of matter comprising a thermoplastic polymeric alpha methyl methacrylate resin and a plasticizer therefor, said composition being moldable to a tough, rigid solid at temperatures between 80–200° C.

7. Process of producing a molded article which comprises introducing a composition containing liquid monomeric alpha methyl methacrylate into a mold and polymerizing in situ.

8. Process of producing a molded article which comprises introducing a composition containing liquid monomeric alpha methyl methacrylate into a mold and heating to a temperature of at least 60° C. to polymerize the monomeric compound.

9. Process of producing a molded article which comprises introducing a composition containing liquid monomeric alpha methyl methacrylate and benzoyl peroxide as a polymerizing catalyst into a mold and polymerizing the monomeric compound in situ.

10. Process of producing a molded article which comprises introducing a composition containing polymeric methyl methacrylate resin into a mold and heating to a temperature of at least 80° C. under pressure.

11. A process of producing a molded article which comprises introducing a composition containing polymeric methyl methacrylate resin into a mold and heating to a temperature of 80–200° C. under pressure.

ROWLAND HILL.

---

CERTIFICATE OF CORRECTION.

Patent No. 1,980,483.   November 13, 1934.

ROWLAND HILL.

It is hereby certified that error appears in the printed specification of the above numbered patent requiring correction as follows: Page 2, line 8, before the word "colouring" insert the word or; and that the said Letters Patent should be read with this correction therein that the same may conform to the record of the case in the Patent Office.

Signed and sealed this 5th day of March, A. D. 1935.

Leslie Frazer (Seal)   Acting Commissioner of Patents.